United States Patent
Bray et al.

(10) Patent No.: US 8,134,345 B2
(45) Date of Patent: Mar. 13, 2012

(54) CRYOGENIC EXCITER

(75) Inventors: James William Bray, Niskayuna, NY (US); Luis Jose Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1188 days.

(21) Appl. No.: 11/288,551

(22) Filed: Nov. 29, 2005

(65) Prior Publication Data

US 2007/0120539 A1     May 31, 2007

(51) Int. Cl.
*H02P 9/10*     (2006.01)
*H02P 9/14*     (2006.01)
*H02P 11/00*    (2006.01)
*H02P 9/00*     (2006.01)
*H02H 7/06*     (2006.01)

(52) U.S. Cl. .................. 322/59; 322/25; 310/52

(58) Field of Classification Search ............ 322/25, 322/59; 310/52
See application file for complete search history.

(56) References Cited

U.S. PATENT DOCUMENTS

| | | | | |
|---|---|---|---|---|
| 3,223,916 A * | 12/1965 | Shafranek et. al. | ............ | 363/109 |
| 3,359,438 A * | 12/1967 | Hylen | ............ | 310/68 R |
| 3,471,726 A | 10/1969 | Burnier et al. | ............ | 310/54 |
| 3,521,132 A * | 7/1970 | Petersen et. al. | ............ | 257/722 |
| 3,549,981 A * | 12/1970 | Dolbec | ............ | 322/25 |
| 3,702,965 A * | 11/1972 | Drexler et al. | ............ | 322/25 |
| 3,816,780 A * | 6/1974 | Smith et al. | ............ | 310/52 |
| 4,013,908 A * | 3/1977 | Weghaupt | ............ | 310/61 |
| 4,017,755 A * | 4/1977 | Litz | ............ | 310/40 R |
| 4,035,678 A * | 7/1977 | Lambrecht et al. | ............ | 310/52 |
| 4,063,122 A * | 12/1977 | Kullmann et al. | ............ | 310/64 |
| 4,079,273 A * | 3/1978 | Lambrecht et al. | ............ | 310/52 |
| 4,176,292 A * | 11/1979 | Kalsi et al. | ............ | 310/52 |
| 4,204,134 A * | 5/1980 | Fritz et al. | ............ | 310/52 |
| 4,228,374 A * | 10/1980 | Elsel | ............ | 310/53 |
| 4,267,474 A * | 5/1981 | Kullmann | ............ | 310/52 |
| 4,295,067 A * | 10/1981 | Binder et al. | ............ | 310/52 |
| 4,297,603 A * | 10/1981 | Weghaupt | ............ | 310/53 |
| 4,309,632 A * | 1/1982 | Muller et al. | ............ | 310/52 |
| 4,315,172 A * | 2/1982 | Intichar et al. | ............ | 310/53 |
| 4,323,801 A | 4/1982 | Weghaupt et al. | ............ | 310/52 |
| 4,328,437 A * | 5/1982 | Intichar et al. | ............ | 310/52 |

(Continued)

FOREIGN PATENT DOCUMENTS

DE       10310309 A1  *  9/2003

(Continued)

OTHER PUBLICATIONS

DC-DC Converter Basics, G. Ledwich 1998. http://www.powerdesigners.com/InfoWeb/design_center/articles/DC-DC-converter.shtm.*

(Continued)

*Primary Examiner* — Pedro J Cuevas
(74) *Attorney, Agent, or Firm* — Penny A. Clarke

(57) ABSTRACT

The disclosed technology is a cryogenic static exciter. The cryogenic static exciter is connected to a synchronous electric machine that has a field winding. The synchronous electric machine is cooled via a refrigerator or cryogen like liquid nitrogen. The static exciter is in communication with the field winding and is operating at ambient temperature. The static exciter receives cooling from a refrigerator or cryogen source, which may also service the synchronous machine, to selected areas of the static exciter and the cooling selectively reduces the operating temperature of the selected areas of the static exciter.

17 Claims, 2 Drawing Sheets

U.S. PATENT DOCUMENTS

| | | | | |
|---|---|---|---|---|
| 4,352,033 | A | | 9/1982 | Antonov et al. .................. 310/52 |
| 4,386,289 | A | | 5/1983 | Intichar et al. .................. 310/52 |
| 4,477,767 | A | * | 10/1984 | Cotzas ............................ 322/59 |
| 4,682,068 | A | * | 7/1987 | Cotzas et al. .................. 310/198 |
| 4,727,724 | A | | 3/1988 | Intichar et al. .................. 62/55.5 |
| 4,739,200 | A | * | 4/1988 | Oberly et al. .................. 310/10 |
| 4,740,724 | A | * | 4/1988 | Sato et al. ...................... 310/52 |
| 4,977,362 | A | * | 12/1990 | Mader ............................ 318/713 |
| 5,030,863 | A | | 7/1991 | Yoshimura et al. .............. 310/52 |
| 5,440,222 | A | * | 8/1995 | Tanaka et al. .................. 322/25 |
| 6,252,753 | B1 | | 6/2001 | Bhargava ........................ 361/62 |
| 6,278,212 | B1 | | 8/2001 | Kalsi .............................. 310/162 |
| 6,420,842 | B1 | | 7/2002 | Gold .............................. 318/141 |
| 6,737,767 | B2 | * | 5/2004 | Berggren et al. ............... 310/51 |
| 6,791,216 | B2 | * | 9/2004 | Kalsi .............................. 310/52 |
| 6,900,714 | B1 | | 5/2005 | Huang et al. .................. 335/216 |
| 2003/0146731 | A1 | * | 8/2003 | Berggren et al. ............... 318/708 |
| 2004/0150233 | A1 | * | 8/2004 | Kajiura .......................... 290/24 |
| 2004/0155538 | A1 | * | 8/2004 | Kalsi .............................. 310/52 |
| 2004/0160134 | A1 | * | 8/2004 | Blatter et al. .................. 310/52 |
| 2006/0119193 | A1 | * | 6/2006 | Laskaris et al. ................ 310/52 |

FOREIGN PATENT DOCUMENTS

| | | |
|---|---|---|
| EP | 0227993 B1 | 4/1992 |
| JP | 01069257 A | 3/1989 |
| JP | 01069258 A | 3/1989 |
| JP | 01069259 A | 3/1989 |
| JP | 02246800 A | 10/1990 |
| WO | WO 01/03273 A1 | 1/2001 |
| WO | WO 01/52276 A2 | 7/2001 |
| WO | WO 01/52392 A1 | 7/2001 |
| WO | WO 01/52393 A1 | 7/2001 |

OTHER PUBLICATIONS

European Search Report for Application No. EP 06 25 4931, dated Aug. 14, 2009.

* cited by examiner

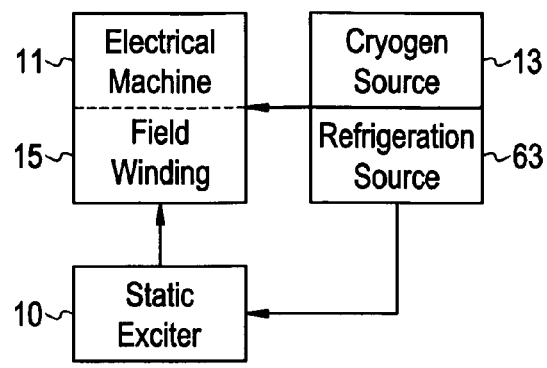
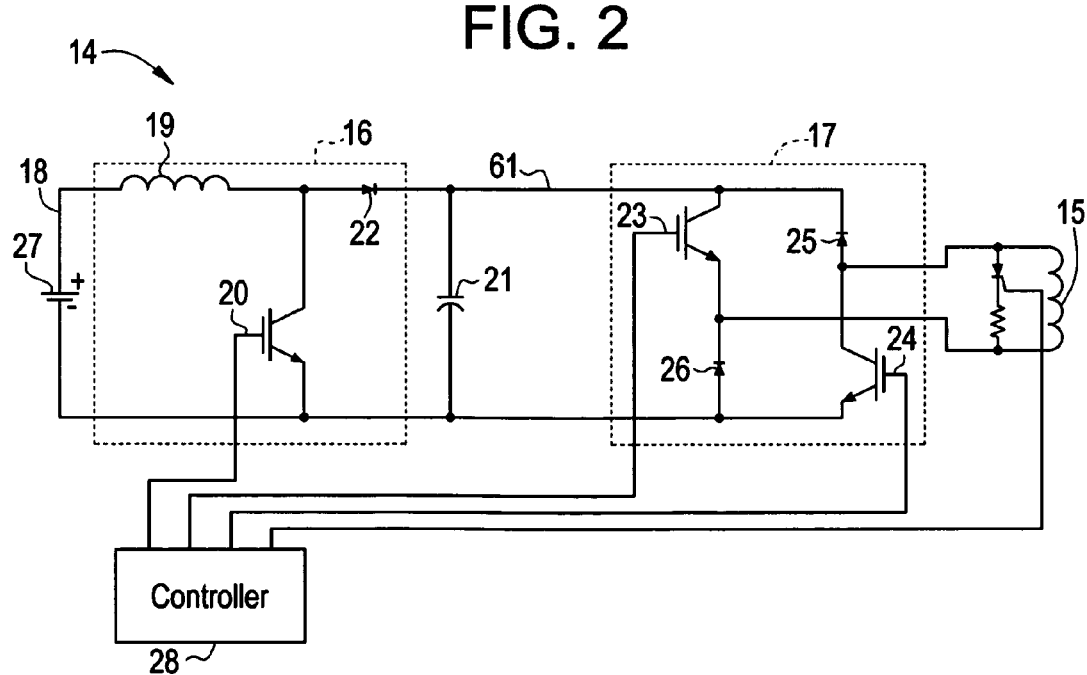

CRYOGENIC EXCITER

REFERENCE TO GOVERNMENT CONTRACTS

The U.S. Government may have certain rights in this invention under Contract Number DE-FC36-02GO011100 awarded by the Department of Energy.

BACKGROUND

Traditionally, exciters for synchronous machines are mounted near the stator of the synchronous machine with electrical connection to the field winding, usually found on the rotor. The function of the exciter is to provide electrical current to the field winding and thereby produce a magnetic field required for machine operation. These field exciters may be thought of as direct current (DC) controlled amplifiers of relatively high current rating and bandwidth with the role to control the machine output voltage. These amplifiers may use, among other power electronics, thyristor bridges fed directly from a three-phase transformer connected to a grid or directly from the machine terminals to generate the DC voltage feeding the machine's exciter winding. When used to supply machines used for power generation, the field exciters are generally large in size and weight due in part to the weight of their magnetic components. For example, airplanes that have large power requirements are directly impacted by the size, output power and weight of electrical generators and their accompanying field exciters. If airplanes continue to have larger power requirements, the size and weight of power generating synchronous machines will be an increasing issue.

Attempts in the past to resolve the issue of size and weight of synchronous machines have succeeded in some respects and failed in other respects. A relatively recent idea is cryogenically cooling part of the synchronous machine including the field exciter and portions may be made superconducting. It is generally accepted that cryogenic cooling is around 100 K (Kelvin) and below. At low temperatures, the current handling capabilities and switching speeds of many semiconductor devices improve and the resistance of coils and conductors are reduced, with superconductors obtain zero resistance at DC; thus, size and weight of these components is reduced. Although this approach reduces the size and weight of components and improves performance, it may prove uneconomical because cooling may do little to reduce some components' size and weight or the cooling is too expensive.

BRIEF DESCRIPTION OF THE INVENTION

The disclosed technology is a cryogenic static exciter. The cryogenic static exciter is connected to the field winding of a synchronous electric machine. The synchronous electric machine may also be cryogenically cooled via a cryogen or refrigeration. The static exciter is electrically connected to the field winding and some of its parts may be operating at ambient temperature. Selected areas of the static exciter receive cooling from a refrigerator or cryogen source, which may also service the cryogenic synchronous machine and the cooling selectively reduces the operating temperature of the static exciter.

The above described and other features are exemplified by the following figures and detailed description.

BRIEF DESCRIPTION OF THE DRAWINGS

Referring now to the figures wherein the like elements are numbered alike:

FIG. 1 illustrates a top level block diagram view of an exemplary embodiment of a static cryogenic exciter.

FIG. 2 illustrates a schematic view diagram of a field exciter for a synchronous machine.

DETAILED DESCRIPTION OF THE INVENTION

Figure 3:
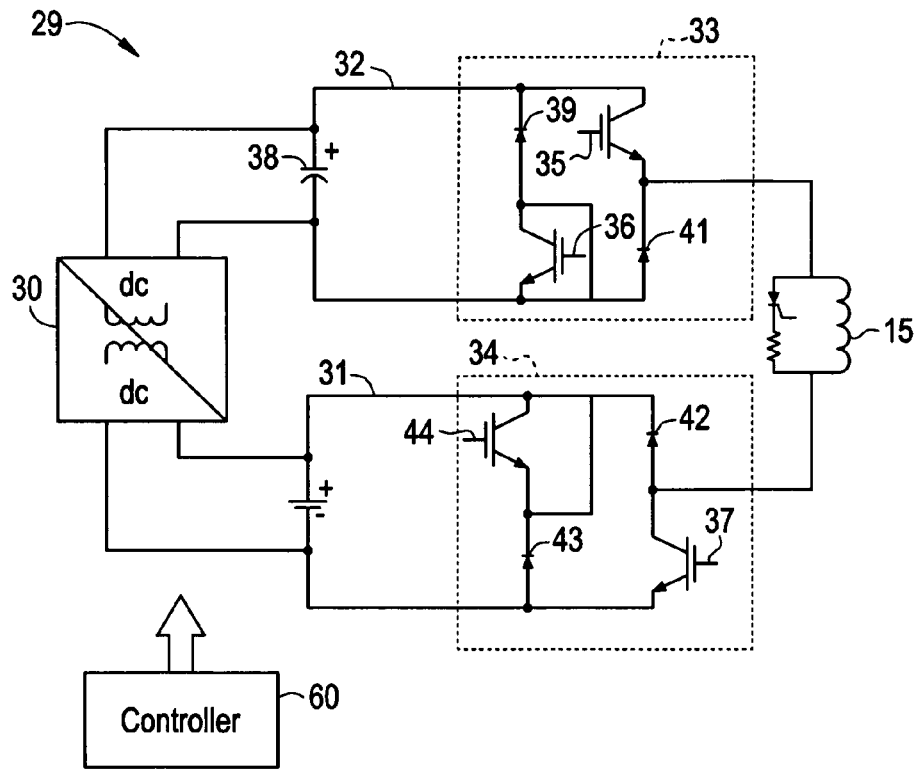
FIG. 3 illustrates a schematic view diagram of an alternate embodiment of FIG. 2.

The disclosed technology is a cooled static exciter 10, FIG. 1, for a synchronous electrical machine 11. The electrical machine 11 may, if desired, have a wound-field or homopolar rotor; i.e., the field winding 12 may be installed on the rotor or on the stator of the electrical machine 11. The electrical machine 11 may, if desired, be cryogenic in that portions may be cooled to 100 K (Kelvin) or below. An example of this is an electrical machine 11 being cooled to 77 K by encompassing the field winding in a liquid cryogen. An example of a liquid cryogen is liquid nitrogen. The electrical machine's 11 stator windings and field winding may, if desired, be manufactured from copper, aluminum or a superconducting material.

The static exciter 10, FIG. 1, is positioned in close proximity to the electrical machine 11. The static exciter 10 is a direct current (DC) controlled amplifier of relatively high current rating. This amplifier may use a thyristor bridge fed directly from a three-phase transformer connected to a grid to generate the DC voltages feeding the electrical machine's 11 field winding. When the electrical machine 11 is used for power generation, they are generally large in size and weight due to the weight of their electromagnetic and structural components. To reduce the size and weight of the electrical machine 11, it may be cryogenically cooled via a cryogenic source 13.

A cooled electrical machine 11 may also supply cooling to the static exciter 10 or the static exciter 10 may receive cooling directly from a cryogenic source 13 and/or a refrigeration source 63, FIG. 1. The static exciter 10 selectively directs the cooling 13 and/or 63 to the electronic circuitry of the static exciter 10. The selective application of the cooling 13 and/or 63 enables the static exciter 10 to reduce the size and weight of the exciter in a prudent and economic fashion. It may be more economical to cool some areas of the static exciter 10 than other areas. The areas to be cooled may contain semiconductors, electrical conductors, filters, capacitors, inductors, or power transformers.

Semiconductor devices: It is known that a significant reduction in the losses due to on-resistance can be achieved for semiconductor switches such as power MOSFETs and insulated gate bipolar transistors (IGBT) when operated at low temperatures. The major gain is seen in the reduction of resistive losses from the relatively high current required for the field excitation. The devices can also switch at higher speed when cooled, allowing higher speed and more compact circuitry gaining also from the reduction in switching losses.

The electrical conductors: The wiring required by static exciter 10 has to carry a large amount of current and its contribution to the total system power losses and weight is significant. Making the wiring from high temperature superconducting material reduces the losses and size/weight of the wiring. However, if the use of high temperature superconducting material were impractical, even cooling conventional copper or aluminum wiring will improve its conductivity and performance.

Filters: The large current and its control will require the use of semiconductors switching at high frequencies. In order to reduce the amount of electromagnetic interference being emitted by the cabling, transformers and other components, the output of these devices will have to be not only shielded but also filtered using inductors that can be built with high temperature superconducting windings or cooled conventional conductors, thereby reducing their losses, weight and size. Also, electromagnetic interference shielding material can be made from high temperature superconducting or cooled conductors to further reduce the size and increase the conductivity and therefore the shielding capability. Filters are also used to help smooth the DC output of the exciter. Filters commonly contain capacitors and diodes, which may also benefit from cooling.

Power transformers: A high value of the inductance of the field winding 15, together with the control bandwidth required for a tight voltage regulation of the electrical machine 11, require the use of a current amplifier with a high voltage output (up to ~1 kV). This voltage level may be limited to lower values in some applications like aircraft (max. 270V) due to corona effects that can appear at high elevations. These voltages require the use of power transformers, which can benefit from the use of high temperature superconducting or cooled conventional windings to reduce size, weight and power losses.

An example of a static exciter 14 is FIG. 2. The static exciter 14 controls the current to the field winding coil 15 of an electric machine, i.e. a motor or a generator. The static exciter 14 includes a selected number of the components discussed above that are candidates for cooling. The cooling of the static exciter 14 is from its operating ambient temperature of about 340K for selected components to below 100K for cryogen cooling and above 100K for refrigeration cooling. The static exciter 14 includes a boost converter 16 and a buck converter 17. The boost converter 16 is configured to convert a low DC voltage to a high DC voltage. The low voltage DC power is supplied on a low-voltage DC bus 18, while the high voltage DC power is output on a high voltage DC bus 61.

The boost converter 16, FIG. 2 includes an inductor 19 and an IGBT switch 20. The IGBT switch 20 is coupled across the DC bus and may be switched, for example, in a pulse width modulated regime to convert electrical power from the low voltage bus 18 to a higher voltage that is applied to the high voltage DC bus 61 as described below. A capacitor 21 is electrically coupled in parallel to the IGBT switch 20 and stores the higher voltage. A diode 22 prevents flow of current back from the high voltage DC bus 61 to the boost converter 16.

The buck converter 17, FIG. 2 comprises a first buck converter IGBT switch 23, a second buck converter IGBT switch 24 and a pair of flyback diodes 25, 26 coupled around IGBT switches 23 and 24. The coil is charged or discharged according to the switching of first and second buck converter IGBT switches 23, 24. As will be appreciated by those skilled in the art, in the illustrated embodiment the buck converter is a two quadrant converter meaning that the first and second buck converter switches are switched in a non-current reversing but polarity reversing manner.

During normal operation, the boost converter 16, FIG. 2 is coupled to a DC power source 27. The DC power source 27 is shown as a battery in the figures, but may be any low voltage source. As shown, a controller 28 is electrically connected to provide control signals to the gates of IGBT switch 20 of the boost converter 16 and to IGBT switches 23 and 24 of the buck converter 17 to provide the voltages required to excite the field winding coil 15. In particular, pulse width modulation (PWM) of a boost IGBT switch 20 by the controller 28 builds up a desired high-voltage in the capacitor 21 for the high voltage DC bus 61. When charging the field winding coil 15, the capacitor 21 discharges to supply voltage to the buck converter 17.

The boost converter 16, FIG. 2 and the buck converter 17 may, if desired, be cooled in their entirety. The capacitor 21 may also be cooled but limited benefit may be achieved. The economic value of cooling the boost converter 16 and the buck converter 17 may be of consideration. Depending on the cost of cooling, a selected number of components may be cooled instead of the entire boost converter 16 and the buck converter 17. For example, the IGBT switches 20, 23, 24 and 26 are cooled instead of all of the components of the boost converter 16 and the buck converter 17. The IGBT switch's 20, 23, 24 and 26 current handling properties more than double when cooled from 350K to 77K. The IGBT switches 20, 23, 24 and 26 benefit the most of any non-coil component of the static exciter 14 circuit from cooling.

Another example is a multilevel static exciter 29 FIG. 3, using a DC/DC converter 30 to convert a low voltage to a high voltage. The DC/DC converter 30 is coupled between the low voltage bus 31 and the high voltage bus 32. The stacked bridges are buck converters, a high voltage bus converter 33 and a low voltage bus converter 34, each having a pair of IGBT switches 35, 36 and 44, 37 respectively. The gates of the switches are connected to controller 60. The lines connecting controller 60 to the gates have been eliminated for the sake of clarity. The switches are PWM switched by controller 60, as previously described, to provide the field winding coil 15 with the necessary voltage. For example, in order to supply the field winding coil 15 with the full high voltage from the high voltage bus, the controller 60 places all of the IGBT switches in a conductive state. In order to discharge to the capacitor 38, the controller 60 places both the first high voltage bus IGBT switch 36 and the second high voltage bus IGBT switch 35 in a non-conductive state, while the first low voltage bus IGBT switch 44 and the second low voltage IGBT switch 37 are placed in a conductive state. Current flows from the field winding coil 15 through both of the low voltage bus converter switches and the low voltage bus flyback diode 43 and through the first high voltage bus flyback diode 39 to the DC-link capacitor 38.

This configuration provides many of the same advantages of the circuits previously described. For example, if the DC/DC converter 30 were bi-directional, it could be used to regenerate the system bus. Additionally, high voltages can be achieved from a low voltage source/bus and a range of voltages can be provided to the coil according to the needs at the time.

The buck converters 33, 34 of FIG. 3 may, if desired, be cooled in their entirety. The capacitors 38 and diodes 39, 41, 42 and 43 may also be cooled but limited benefits may be achieved by cooling. As discussed above, cooling the buck converters 33 and 34 is possible but cooling selected areas of the multilevel static exciter 29 may very well be more economically rewarding. For example, the DC-to-DC converter 30 is a power transformer that benefits directly from cooling. If the temperature of the DC-to-DC converter 30 is reduced from 350K to 77K, i.e. a factor of five, the resistance of the DC-to-DC converter is reduced by around a factor of five.

Figure 4:
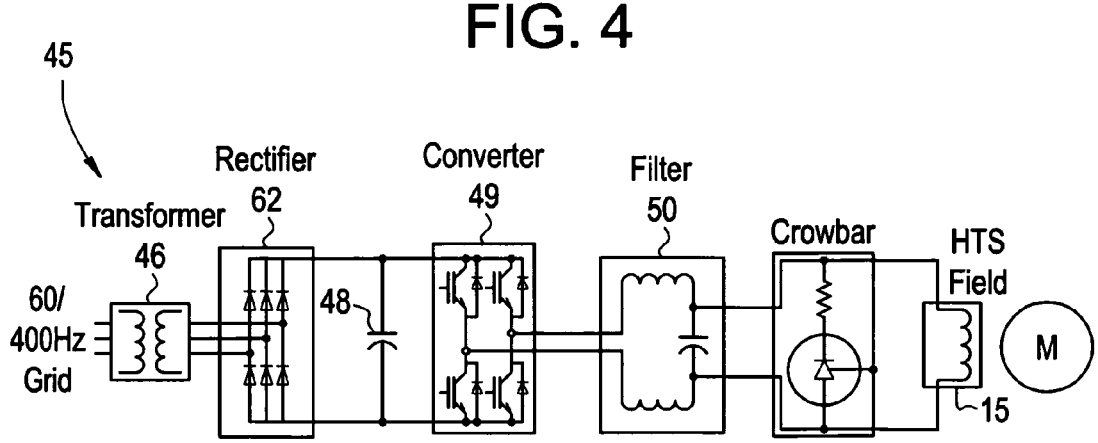
FIG. 4 illustrates a schematic view diagram of a second alternate embodiment of FIG. 2.

Another example is the static exciter 45 of FIG. 4. The static exciter 45 has a power transformer 46 feeding a three-phase diode rectifier bridge 62 that is connected to a capacitor 48. This part of the circuit converts AC to DC voltage and then fed to the DC-DC converter 49 and filtered by a low pass filter 50. The filter 50 is connected to the field winding coil 15 of an electric machine, i.e. motor or generator. The connection between circuit components is via bus bars for high current transmission. The components that are primary beneficiaries of cooling this type of static exciter are the coils of the filter 50, the power transformer 46 and the bus bar connections between them. As discussed above, the power transformer, filter coils and bus bars receive a direct benefit from cooling. If the temperature of the aforementioned components is reduced from 350K to 77K i.e., a factor of five, the resistance of the aforementioned components is reduced by a factor of five. These components account for the largest percentage of size and weight of the static exciter 45. Therefore, the greatest benefits for size and weight reduction from cooling are the power transformer, filter coils and bus bars.

There are other components of the static exciter 45, FIG. 4, that benefit from cooling. They are diodes 47, semiconductor switches and diodes in the converter 49 and capacitor 48, but the economic benefit may be limited, i.e., the economic benefit may not be dramatic as with power transformers, coils and bus bars. Cooling above 100K, may maximize the economic benefit of cooling selected components. The economic question is optimizing the benefit of cooling to a particular temperature with the cost of that cooling. Cooling above 100K may, if desired, be accomplished by refrigeration source 63, as can lower temperature cooling. For example, cooling the diodes 47 and capacitor 48 by refrigeration source 63 to a temperature of 170K maximizes economic benefit and does not incur the added expense of further cooling. If desired, a combination of cooling temperatures may be used on the same static exciter. For example, static exciter 45 may have lower-temperature cooling applied to power transformers, coils, bus bars and higher temperature cooling applied to diodes, switches and capacitors.

While the invention has been described with reference to an exemplary embodiment, it will be understood by those skilled in the art that various changes may be made and equivalents may be substituted for elements thereof without departing from the scope of the disclosed technology. In addition, many modifications may be made to adapt a particular situation or material to the teachings of the disclosed technology without departing from the essential scope thereof. Therefore, it is intended that the disclosed technology not be limited to the particular embodiment disclosed as the best mode contemplated for carrying out this invention, but that the invention will include all embodiments falling with the scope of the appended claims.

What is claimed is:

1. An apparatus for a cryogenic static exciter comprising:
    a synchronous electric machine having a field winding;
    a static exciter in communication with said field winding; said static exciter having at least one selected area with electronic circuitry, said electronic circuitry having an operating temperature;
    wherein said at least one selected area is cryogenically cooled, thereby reducing said operating temperature of said electronic circuitry.

2. An apparatus for a cryogenic static exciter as recited in claim 1 wherein said field winding is static.

3. An apparatus for a cryogenic static exciter as recited in claim 1 wherein said field winding is rotating.

4. An apparatus for a cryogenic static exciter as recited in claim 1 wherein said operating temperature of said electronic circuitry is around 340K.

5. An apparatus for a cryogenic static exciter as recited in claim 1 wherein said synchronous electric machine is a cooled electric machine.

6. An apparatus for a cryogenic static exciter as recited in claim 1 wherein said synchronous electric machine is a generator.

7. An apparatus for a cryogenic static exciter as recited in claim 1 wherein said synchronous electric machine is a motor.

8. An apparatus for a cryogenic static exciter as recited in claim 1 wherein said electronic circuitry of said static exciter comprises a buck converter.

9. An apparatus for a cryogenic static exciter as recited in claim 1 wherein said electronic circuitry is selected from a group consisting of semiconductor switch, insulated gate bipolar transistor, inductors, coils and MOSFET.

10. An apparatus for a cryogenic static exciter as recited in claim 1 wherein said electronic circuitry of said static exciter comprises a capacitor.

11. An apparatus for a cryogenic static exciter as recited in claim 1 wherein said electronic circuitry of said static exciter comprises a DC-to-DC converter.

12. An apparatus for a cryogenic static exciter as recited in claim 1 wherein said electronic circuitry of said static exciter comprises a power transformer.

13. An apparatus for a cryogenic static exciter as recited in claim 1 wherein said reduced operating temperature is 77 K.

14. An apparatus for a cryogenic static exciter as recited in claim 1 wherein said reduced operating temperature comprises a plurality of temperatures for a plurality of electronic components of said electronic circuitry.

15. An apparatus for cooling a static exciter comprising:
    a synchronous electric machine having a field winding;
    a static exciter in communication with said field winding; said static exciter having at least one selected area with electronic circuitry, said electronic circuitry having an operating temperature;
    wherein said at least one selected area receives cryogenic cooling to cool said electronic circuitry; and
    wherein said at least one selected area receives refrigerant to cool said electronic circuitry; and
    wherein said refrigeration and cryogenic cooling reduces said operating temperature of said electronic circuitry.

16. An apparatus for a cryogenic static exciter as recited in claim 15 wherein said reduced operating temperature comprises a plurality of temperatures for a plurality of electronic components of said electronic circuitry.

17. A method for a cryogenic static exciter comprising:
    providing a synchronous electric machine having a field winding;
    providing a static exciter in communication with said field winding; said static exciter having at least one selected area with electronic circuitry, said electronic circuitry having an operating temperature;
    cryogenically cooling said at least one selected area of said static exciter, thereby reducing said operating temperature of said electronic circuitry.

\* \* \* \* \*